United States Patent [19]

Kitamura

[11] Patent Number: 5,153,784
[45] Date of Patent: Oct. 6, 1992

[54] MAGNETIC DISK APPARATUS HAVING A READ/WRITE CONTROL CIRCUIT

[75] Inventor: Yoshiji Kitamura, Tokyo, Japan

[73] Assignee: NEC Corporation, Tokyo, Japan

[21] Appl. No.: 529,415

[22] Filed: May 29, 1990

[30] Foreign Application Priority Data

May 29, 1989 [JP] Japan .................................. 1-135026

[51] Int. Cl.$^5$ ............................................. G11B 15/04
[52] U.S. Cl. ........................................................ 360/60
[58] Field of Search ...................................... 360/60, 49

[56] References Cited

U.S. PATENT DOCUMENTS

| | | | |
|---|---|---|---|
| 4,405,952 | 9/1983 | Slakmon | 360/49 |
| 4,774,700 | 9/1988 | Satoh et al. | 360/60 |
| 4,839,753 | 6/1989 | Ide et al. | 360/60 |
| 4,841,384 | 6/1989 | Murakami et al. | 360/60 |
| 4,885,735 | 12/1989 | Fukushima et al. | 360/49 |

Primary Examiner—David J. Severin
Attorney, Agent, or Firm—Sughrue, Mion, Zinn, Macpeak & Seas

[57] ABSTRACT

A magnetic disk apparatus for reading and writing user's data from a magnetic disk having a data surface with a plurality of concentric data tracks the data surface having a void area in which user's data is inhibited. The magnetic disk apparatus includes a magnetic head for reading and writing the user's data from and to the data tracks, detecting apparatus for detecting a circumferential position of the magnetic head at a target track, a store for storing the position and length of the void area, a timing clock generator for generating a read/write synchronization signal and control circuitry for preventing transmission of the read/write synchronization signal during a time period corresponding to the length of the void area when the circumferential position of the magnetic head corresponds to the position of the void area, thereby inhibiting read-out or write-in to or from an interface circuit while transmission of read/write synchronization signal is prevented.

19 Claims, 7 Drawing Sheets

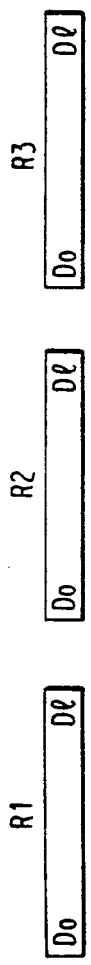
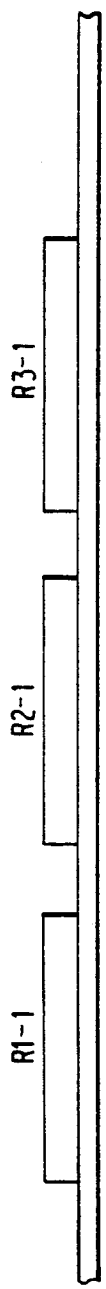
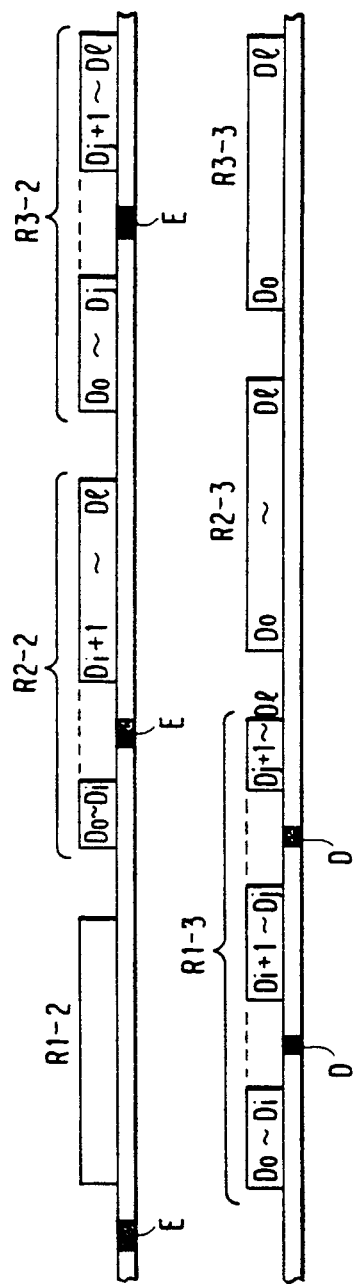
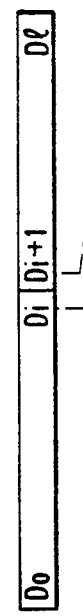
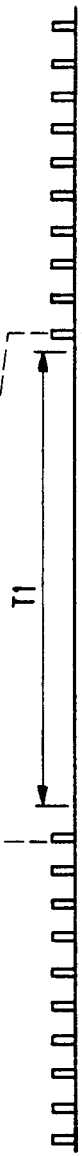
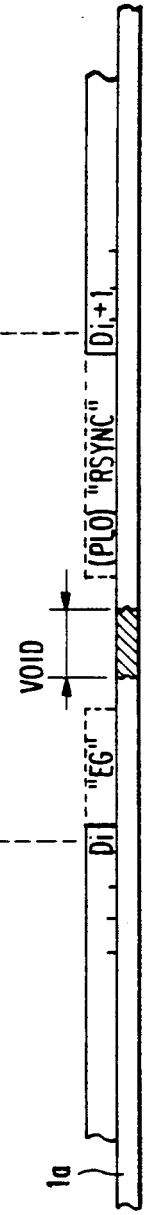

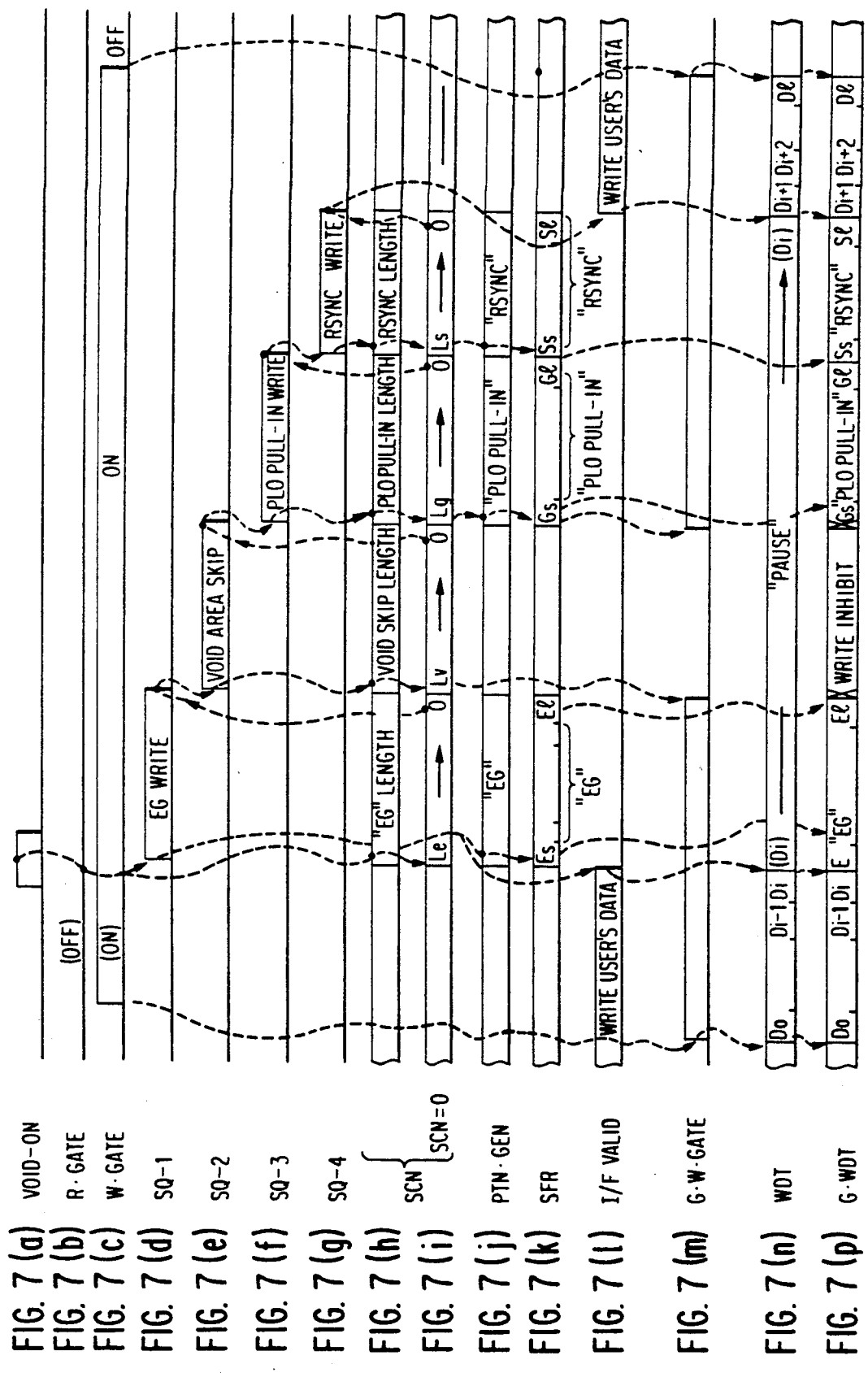

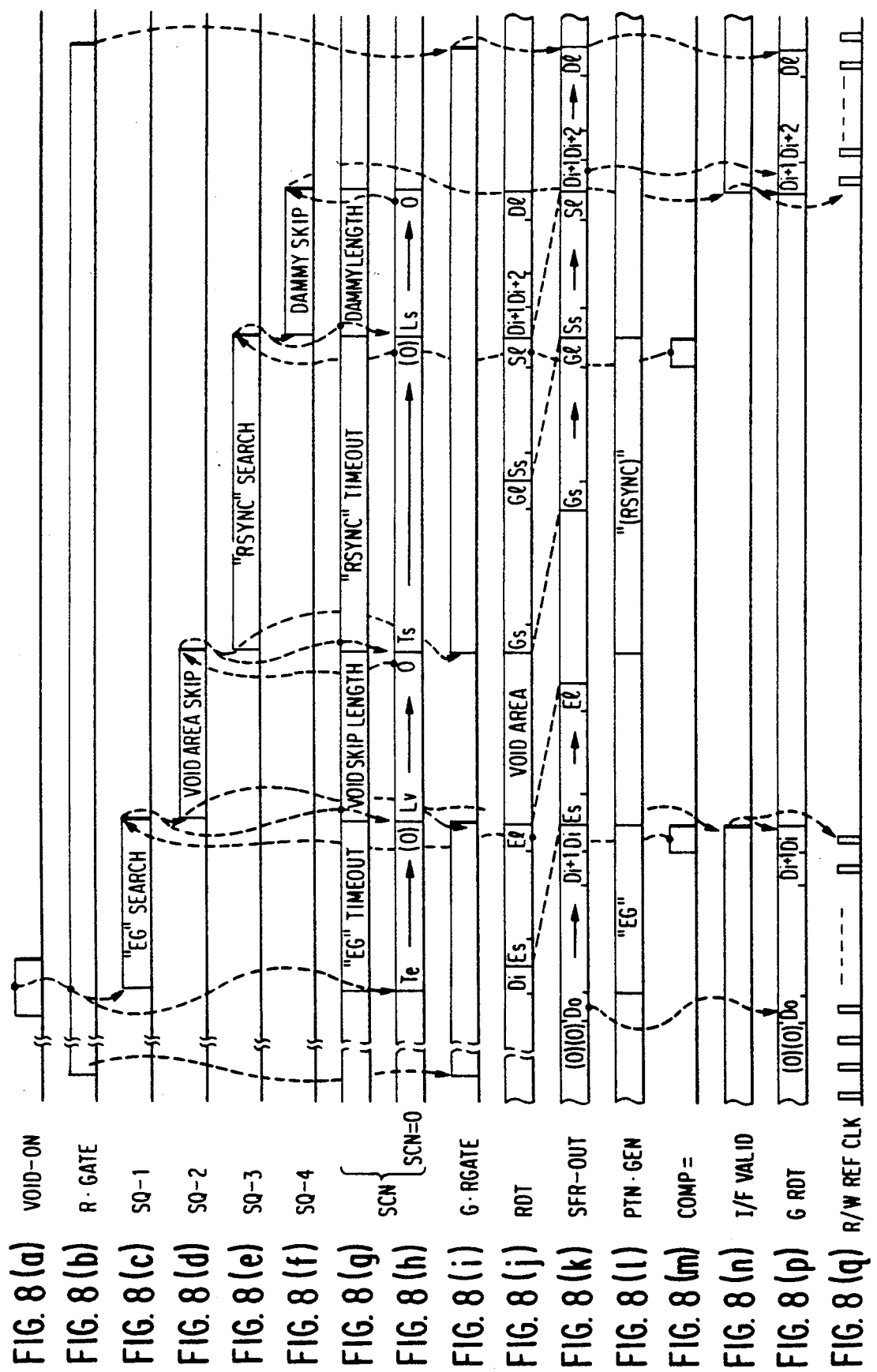

MAGNETIC DISK APPARATUS HAVING A READ/WRITE CONTROL CIRCUIT

BACKGROUND OF THE INVENTION

The present invention relates to a magnetic disk apparatus having a read/write control circuit for reading and writing data from and to only valid data areas of a selected target data track by skipping void data areas, such as embedded servo areas and magnetically defective areas.

A magnetic disk apparatus is connected to an apparatus, such as a computer, via an interface control circuit. The magnetic disk apparatus includes a read/write control circuit having timing clock generating means to produce a read/write synchronization signal which is supplied to the interface control circuit and used for transmitting read and write data to and from the computer. More specifically, the interface control circuit sends the write data from the computer to the magnetic disk apparatus in synchronization with the read/write synchronization signal in a write mode. Further, the interface control circuit sends the read data from the magnetic disk apparatus to the computer in synchronization with the read/write synchronization signal in a read mode.

The magnetic disk apparatus has one or more magnetic disks. If the magnetic apparatus has a servo surface assigned on one surface of a plurality of magnetic disk surfaces, servo information read from the servo surface is used for generating the read/write synchronization signal. The other surfaces of the magnetic disks are data surfaces having a plurality of concentric data tracks divided into a plurality of sectors.

The data surfaces of the magnetic disks often have one or more magnetically defective areas in which data cannot be recorded. Further, if embedded servo areas are provided at leading portions of the sectors on the data surfaces, the embedded servo areas cannot be used to record data, either (the magnetically defective area and the embedded servo area are referred to as a void data area or void area). Therefore, it is necessary to prevent the data from being recorded in the void area, and not to treat the signal read from the void area as the read data.

A conventional read/write control circuit of a conventional magnetic apparatus always supplies the read/write synchronization signal to the interface control circuit even when the read or write operation is carried out to the void area. This means that the conventional magnetic apparatus has no means to discriminate the void area from the normal or valid data area. Therefore, the interface control circuit is required to discriminate the void area.

To this end, a control circuit for detecting faulty sectors including a void area is disclosed in U.S. Pat. No. 4,405,952. The control circuit stores the address of the faulty sectors in order to discriminate the faulty sectors from normal or valid sectors. If the read or write operation is to be carried out to the faulty sectors, i.e., if the address of one of the faulty sectors is designated, the control circuit changes the faulty sector address into an address of a replacement sector so that the data to be written into or read from the faulty sector is written to or read from the replacement sector.

The conventional manner described above has, however, a disadvantage in that an excessive time period is required to position a magnetic head to the replacement sector. Further, the length of a data unit (logical record) transferred between the computer and the disk apparatus is limited by the memory capacity of one sector. That is, the capacity of the logical record cannot be larger than the memory capacity of one sector.

SUMMARY OF THE INVENTION

Therefore, an object of the present invention is to provide a magnetic disk apparatus capable of skipping void areas during a read or write operation without the control of an interface control circuit.

Another object of the present invention is to provide a magnetic disk apparatus capable of skipping void areas without using replacement sectors.

Still another object of the present invention is to provide a magnetic disk apparatus capable of setting a length of logical record, which is a data unit transferred between the magnetic disk apparatus and an apparatus, such as a computer, to be an arbitrary length.

A magnetic disk apparatus according to the present invention comprises at least one magnetic disk including a data surface on which a plurality of concentric data tracks are provided, a data surface having a void area in which recording of user's data is inhibited; a magnetic head for reading and writing the user's data from and to the plurality of data tracks; positioning means for positioning the magnetic head at a target track selected from the plurality of concentric data tracks: detecting means for detecting a circumferential position of the magnetic head on the target track: means for storing a position and a length of the void area on the data surface; read/write control means for supplying a read signal read from the target track by the magnetic head to an interface circuit as the user's data, and for supplying the user's data from the interface circuit to the magnetic head as a write signal to write to the target track timing clock generating means for generating a read/write synchronization signal supplied to the interface circuit, the interface circuit receiving the user's data from the read/write control means in synchronization with the read/write synchronization signal and supplying the user's data to the read/write control means in synchronization with the read/write synchronization signal: and control means for preventing the transmission of the read/write synchronization signal during a time period corresponding to the length of the void area when the circumferential position of the magnetic head is equal to the position of the void area.

BRIEF DESCRIPTION OF THE DRAWINGS

FIGS. 1(a)–1(d) and FIGS. 2(a)–2(c) are timing charts showing a principal function of the present invention.

FIGS. 7(a)–7(p) and 8(a)–8(q) are timing charts showing operations of the void area skipping control circuit shown in FIG. 4.

DETAILED DESCRIPTION OF THE PREFERRED EMBODIMENT

Figure 3:
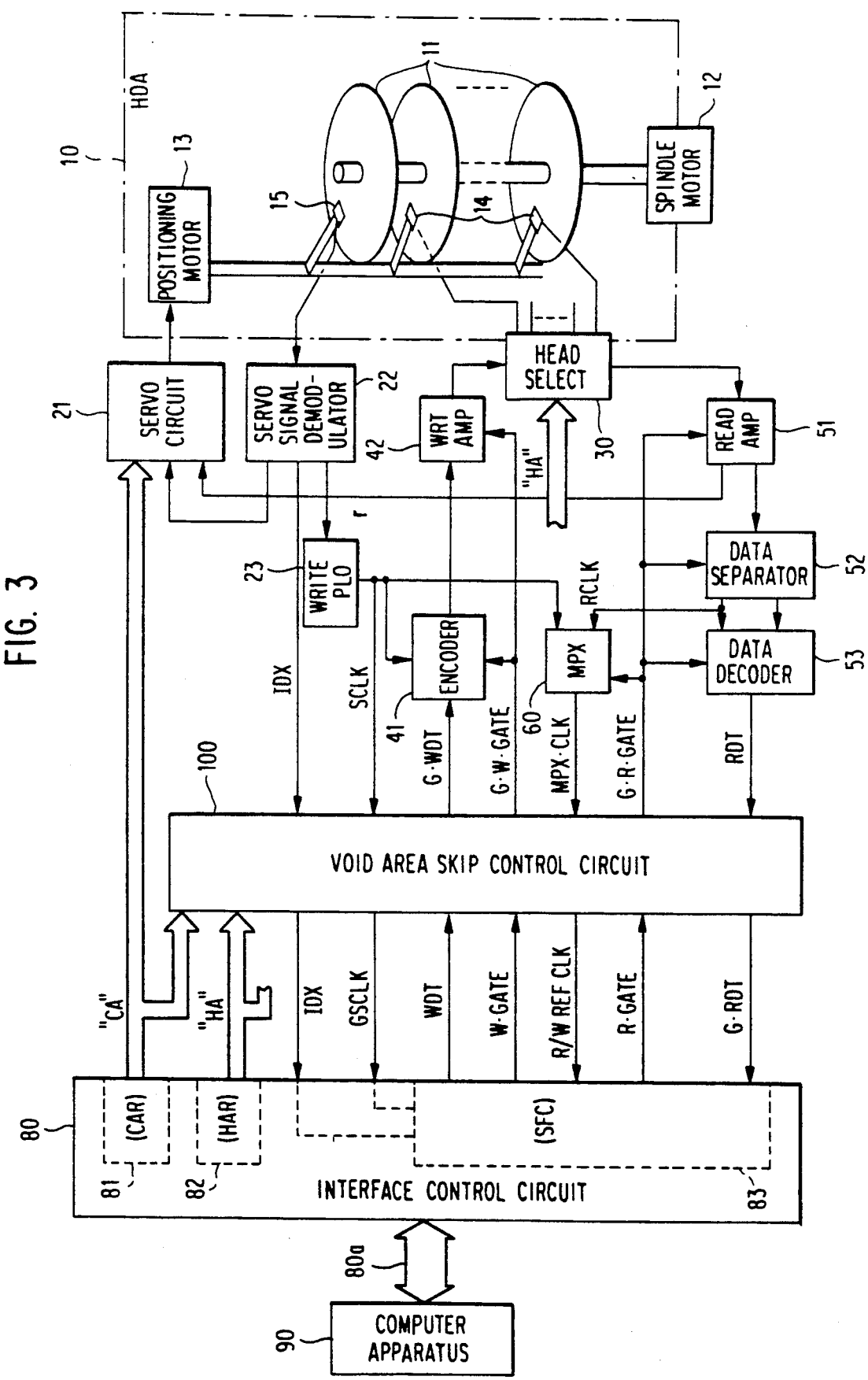
FIG. 3 is a block diagram showing an embodiment of the present invention.

At first, a principal function of a magnetic disk explained.

With reference to FIG. 1(a), data units (logical records) R1, R2 and R3 transferred between an apparatus, such as a computer, and magnetic disk apparatus can be selected to have an arbitrary length ($D_0$ to $D_1$) determined by the requirements of the computer or other apparatus of which the magnetic disk apparatus is a part, irrespective of existence of void areas on a target track. The following description assumes the magnetic disk apparatus is used in a computer. However, the invention disclosed herein is not limited to any specific apparatus with which a magnetic disk apparatus of the invention may be used. The magnetic disk apparatus controls the following physical recording procedure for the logical records R1, R2 and R3 depending on existence of void areas on the target track.

(1) The case where there is no void area on the target track.

As is shown in FIG. 1(b), physical records R1-1, R2-1 and R3-1 are recorded on the target track corresponding to the data units R1, R2 and R3.

(2) The case where there are regular void areas, such as data-surface-embedded servo areas on the target track.

As is shown in FIG. 1(c), physical records R1-2, R2-2 and R3-2 are recorded in the order of the logical records R1, R2 and R3 by skipping void areas. In this example, since there are the data-surface-embedded servo areas E on the target track at portions corresponding to the logical records R2 and R3, the physical record R2-2 corresponding to the logical record R2 is divided and recorded as two physical segments composed of the first length ($D_0$ to $D_i$) and the second length ($D_{i+1}$ to $D_1$) in order to avoid the recording to the void area. Also, the physical record R3-2 corresponding to the logical record R3 is divided and recorded as two physical segments composed of the first length ($D_0$ to $D_j$) and the second length ($D_{j+1}$ to $D_1$).

(3) The case where there are irregular void areas due to magnetic defects on the target track.

As is shown in FIG. 1(d), if there are magnetic defects D on the track corresponding to the logical record R1, the physical record R1-3 is divided and recorded as three physical segments composed of a first segment of length ($D_0$ to $D_i$), a second segment of length ($D_{i+1}$ to $D_j$) and a third segment of length ($D_{j+1}$ to $D_1$) in order to avoid the void areas.

Obviously, the case where cases shown in FIGS. 1(c) and 1(d) are coexistent, can be treated similarly.

Next, converting a logical record to a physical record composed of divided segments, by skipping the void area on the target track will briefly be explained with reference to FIGS. 2(a)-2(c). A logical record (FIG. 2(a)) is applied to magnetic disk apparatus and written to a target track on a disk in for data transfer. The magnetic disk apparatus of the present invention functions to detect in advance the arrival of the void area on the target track, and to suspend the normal data write process upon encounter of the void area. The magnetic disk apparatus writes a particular pattern "EG" ("End Gap") for interruption before the void area. After the central portion of the void area has been passed, the re-synchronization pattern "RSYNC" is written in advance before the normal data write process is resumed as shown in FIG. 2(c). Thereafter, the write process is restarted after the portion of the "RSYNC" pattern. The transmission of the synchronization clock R/W REFCLK for data transfer to the computer is suspended during void area processing period T1 in FIG. 2(b). During this time interval T1, the upper apparatus is in pause condition, so that it does not require any logical control.

In the operation for reading the physical record including the void area, the read-out signal is regarded as normal data and is transmitted to the upper apparatus by means of the synchronization clock R/W REFCLK for data transmission until the detection of the "EG" pattern. The "EG" pattern is detected from the read-out signal and then the interrupted data position $D_i$ is determined. At this instant, the transmission of the synchronization clock R/W REFCLK for data transfer is suspended and the void area processing starts. After the detection of the "EG" pattern, the void area is skipped, and the search of PLO (phase-locked oscillator) pull-in gap and the resynchronization pattern "RSYNC" is initiated. After the "RSYNC" pattern is detected, the following readout signal is regarded as a continuation ($D_{i+1}$ to $D_1$) of the interrupted data block and the normal data transfer to the upper apparatus is re-started by restarting the transmission of synchronization clock R/W REFCLK for data transfer.

Even if there are plural void areas in the same physical record, the processing can be realized by repeating a similar operation.

Now, an embodiment of a magnetic disk apparatus according to the present invention will be explained with reference to FIG. 3.

The magnetic disk apparatus includes a head disk assembly (HDA) 10 which has a plurality of magnetic disks 11 attached to a spindle motor 12, and a plurality of data heads 14 and a servo head 15 driven by a head positioning motor 13.

A head positioning servo circuit 21 has, as its first input, a cylinder address information "CA" from the interface control circuit 80 and, as a feedback input, a position signal from a servo signal demodulator 22. The third input of the circuit 21 is a read signal r supplied from one of the selected data heads 14 through read amplifier 51 for supplying an embedded servo information.

The servo signal demodulator 22 has, as its input, a servo signal from servo head 15, and outputs an index signal IDX and a clock signal applied to a write clock circuit 23 to generate an original servo clock signal SCLK in addition to the position signal for the head positioning servo circuit 21.

A head selection circuit 30 connects one of the data heads 14 to a write amplifier 42 at write mode and to the read amplifier 51 at read mode, according to the head address information "HA" from the interface control circuit 80.

A clock multiplexer 60 receives, as clock inputs, the original servo clock signal SCLK and the read clock signal RCLK from a data separator 52, and, as control input, a gated read control signal G·R·GATE. It outputs, as read/write clock multiplexer signal MPX·CLK, the read clock signal RCLK at read mode and the servo clock signal SCLK at other operation modes.

A write data encoder 41 receives, as control input, a gated write control signal G·W·GATE and, as input data sequence, a gated write data signal G·WDT, and outputs an input pulse train to the write amplifier 42 after converting to the predetermined modulation pattern. Under the control of the gated write control signal G·W·GATE. the write amplifier 42 sends the write pattern to the selected head 14 through the head selection circuit 30.

In the read mode indicated by the gated read control signal G·R·GATE. the read amplifier 51 amplifies and re-shapes the read signal from the selected data head 14 through the head selection circuit 30, and thereafter outputs a read pulse signal to the data separator 52. The data separator 52 receives the read pulse signal from read amplifier circuit 51, generates the read clock signal RCLK, and simultaneously outputs the read pulse signal to read data decoder 53. The read data decoder 53 converts the read pulse signal into a predetermined data code, and then outputs as original read data RDT.

The interface control circuit 80 performs a control operation for connecting the magnetic disk apparatus to an upper apparatus 90 and performs a format control operation for read/write data. The interface control circuit 80 includes a cylinder address register (CAR) 81 for outputting the cylinder address information "CA", a head address register (HAR) 82 for outputting the head address information "HA" and a normal format controller (SFC) 83 for transferring the read and write data to and from the computer apparatus 90.

A void-area-skipping control circuit 100 is installed between the above-mentioned interface control circuit 80 and the circuits in the magnetic disk apparatus for executing the skipping operation without any help by the normal format controller 83 when the head 14 passes over the void area (the embedded servo information area or the defect area) on the target data track. For this purpose, the control circuit 100 performs the following conversion functions: from the original servo clock signal SCLK to the gated servo clock signal GSCLK; from the read/write clock multiplexer signal MPX·CLK to the read/write synchronization signal R/W REFCLK; from the original write gate signal W·GATE to the gated write control signal G·W·GATE; from the original read gate signal R·GATE to the gated read control signal G·R·GATE; from the original write date signal WDT to the gate write data signal GWDT; and from the original read data signal RDT to the gated read data signal GRDT.

Figure 4:
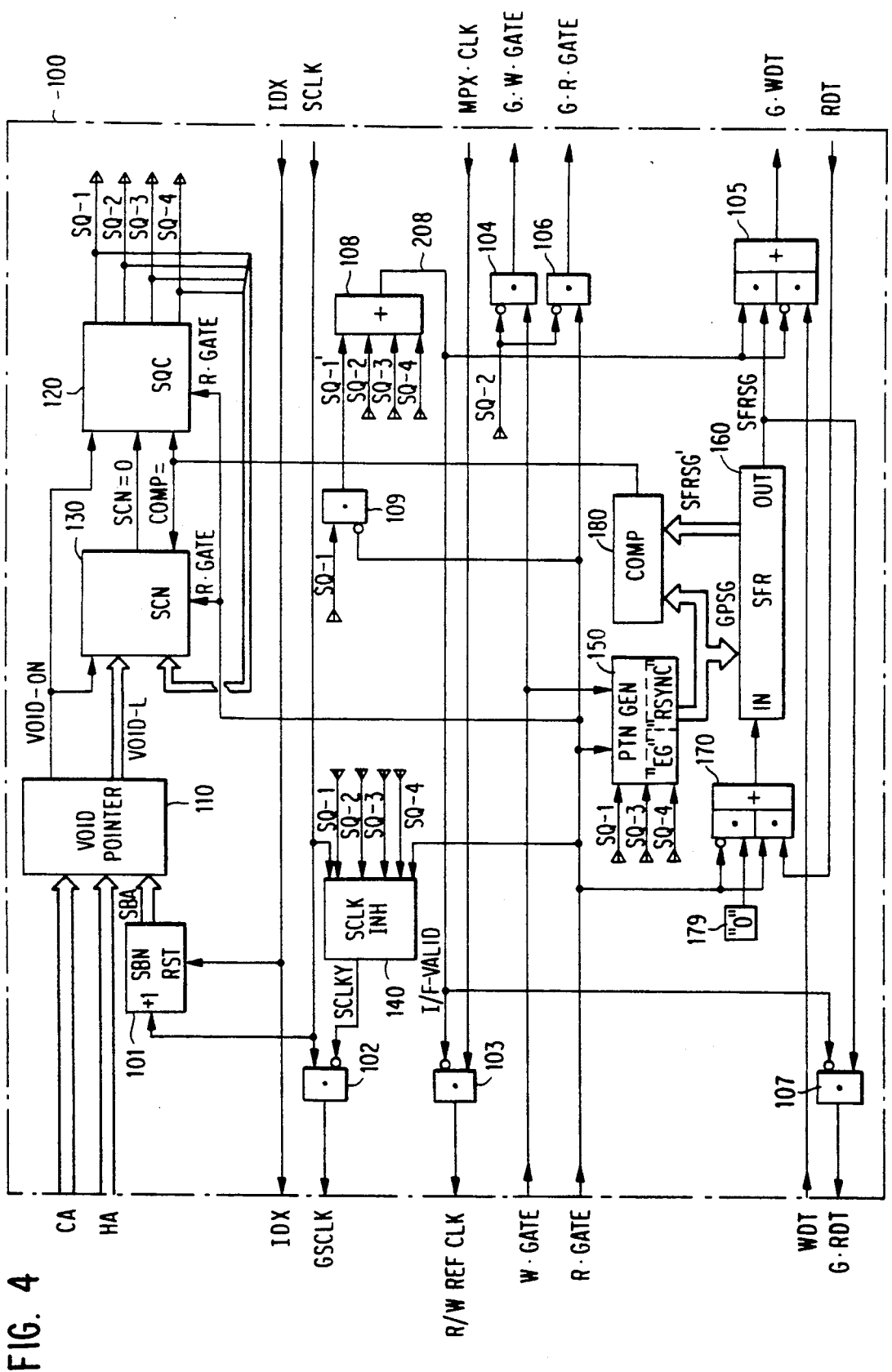
FIG. 4 is a block diagram showing a void area skipping control circuit used in the embodiment of the present invention shown in FIG. 3.
Figure 5:
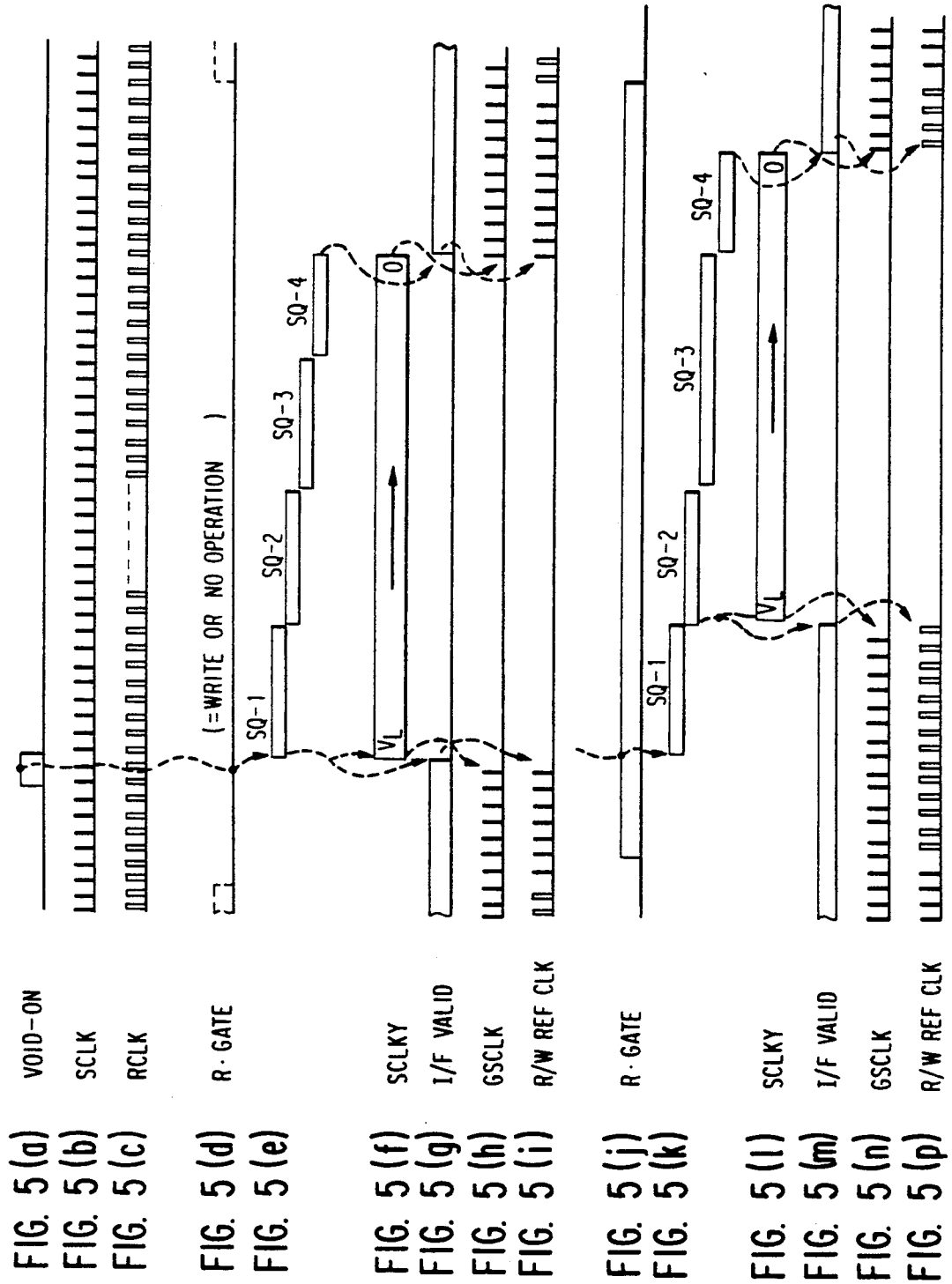
FIGS. 5(a)–5(p) are a timing chart showing an operation of the void area skipping control circuit shown in FIG. 4.

Referring to FIG. 4 and FIGS. 5(a)–5(p), the void-area skipping control circuit 100 includes a servo-byte counter 101 initialized by the index signal IDX. The counter 101 receives as count input a servo clock signal SCLK (FIG. 5(b)) and outputs a head position on a target track as servo-byte address information SBA to a void pointer circuit 110. The void pointer circuit 110 receives as its inputs a cylinder address CA and a head address HA in addition to servo-byte address information SBA, and then compares them with predetermined void-area address information. If they coincide with each other, it outputs a void-control initiation signal VOID-ON and simultaneously applies a void-area-length information VOID-L corresponding to the associated void area to the sequence counter 130.

A sequencer (SQC) 120 executes a series of control sequences for void-area skipping in response to the void control initiation signal VOID-ON (FIG. 5(a)). More specifically, when the original read gate signal R·GATE, which is one of the input signals to the sequencer 120, is on (FIG. 5(j)) at a timing when the signal VOID-ON is output, the sequencer 120 executes a void-area skipping sequence (the details of this sequence are shown in FIG. 8) for the data read mode (READ mode). When the original read gate signal R·GATE is off (FIG. 5(d)), the sequencer 120 executes another void-area skipping sequence (details of this sequence are shown in FIG. 7) for the data write mode (WRITE mode) or neither read-out nor write mode (NOP). In response to the void-control initiation signal VOID-ON and the original read gate signal R·GATE the sequencer 120 outputs sequentially the control tag signals SQ-1, SQ-2, SQ-3 and SQ-4 (FIG. 5(e) or 5(k)). The transition conditions between these tag signals are determined by another input condition, that is a sequence-count termination signal SCN=0 from a sequence counter (SCN) 130 and a pattern coincidence detection signal COMP=0 from a pattern coincidence detector (COMP) 180.

A servo clock inhibitor 140 receives, as its inputs, the original read gate signal R·GATE, the sequence control tag signals SQ-1, SQ-2, SQ-3 and SQ-4, and the servo clock signal SCLK. It outputs a servo clock inhibit signal SCLKY (FIG. 5(f) or 5(l)) which starts at either leading edges of sequence control tag signals SQ-1 or SQ-2 depending on the onand off-status of the original read gate signal R·GATE and lasts for a certain time interval determined by the void-area-length information VOID-L. An AND gate 102 receives original servo clock signal SCLK and the servo clock inhibit signal SCLKY, outputs a gated servo clock signal GSCLK (FIG. 5(h) or 5(n)), and controls the supply of the gated servo clock signal GSCLK to an output terminal depending on the operation modes determined by the original read gate signal R·GATE.

An AND gate 103 has as an original clock input, the clock multiplexer signal MPX·CLK and, as a control input, an interface valid signal I/F-VALID (FIG. 5(g) or 5(m)) which is the output of a read/write synchronization inhibitor composed of an AND gate 109 and an OR gate 108. The AND gate 103 outputs read/write synchronization signal R/W REFCLK, which is inhibited during the void area processing time interval as is shown in FIG. 5(i) or 5(p). The AND gate 109 receives the original read gate signal R·GATE and the sequence control tag signal SQ-1, and outputs a gated sequence control tag signal SQ-1'. The logical OR gate 108 receives the sequence control tag signals SQ-2, SQ-3 and SQ-4 in addition to the gated sequence control tag signal SQ-1', and outputs the interface valid signal I/F-VALID. as is shown in FIGS. 5(g) and 5(m).

An AND gate 106 receives the original read gate signal R·GATE and the sequence control tag signal SQ-2, and outputs a gated read control signal G·R·GATE. The details of the timing of these signals are shown in FIG. 8.

An AND-OR gate 105 constituting a write data multiplexer circuit has, as a discrimination input, the interface valid signal I/F-VALID, and outputs, as gated write data signal G·WDT, either an original write data signal WDT or a bit-serial output signal SFRSG from a shift register 160. The details of the timing of these signals are shown in FIG. 7.

An AND gate 107 receives the bit-serial output signal SFRSG from the shift register 160 and outputs a gated read data signal G·RDT which is gated by the interface valid signal I/F-VALID. When the original read gate signal R·GATE is on, that is, under the data read mode, the original read data signal RDT is applied to input terminal IN of the shift register 160 through one of the inputs of an AND-OR gate 170 which works as a signal multiplexer. The data sequence applied to input terminal IN of shift register 160 is delayed by the number of shift stages of shift register 160 and is outputted as a shift register serial output signal SFRSG' to one of the inputs of the AND gate 107 and also, as a parallel output signal SFRSG of the shift register 160, to one of the inputs of a coincidence detector 180. The coincidence detector 180 compares SFRSG' with its other input GPSG, which is the input of a gap pattern generator 150. If they are equal, a pattern coincidence detection signal "COMP=" is outputted, which is applied to the sequencer 120 and sequence counter 130.

A gap pattern generator 150 receives the original write gate signal W·GATE, the original read gate signal R·GATE, and the sequence control tag signals SQ-1, SQ-3 and SQ-4, and controls the generation of the end gap pattern "EG" indicating the interrupted position of original write data WDT necessary for a series of void area skipping, and also the generation of the phase-locked oscillator (PLO) pull-in and the re-synchronization pattern "RSYNC" indicating the resumption of original write date WDT after skipping the void-area. The details of the timing of a series of gap patterns in the write mode are shown in FIG. 7.

In the read mode, the gap pattern generator 150 generates the end gap pattern "EG" to detect the same pattern "EG" from the original read data RDT and to prevent the transmission of the particular gap pattern to the gated read data signal G·RDT, and moreover generates the "RSYNC" pattern to re-synchronization. The details of the timing of a series of gap patterns in the read mode are shown in FIG. 8.

Figure 6:
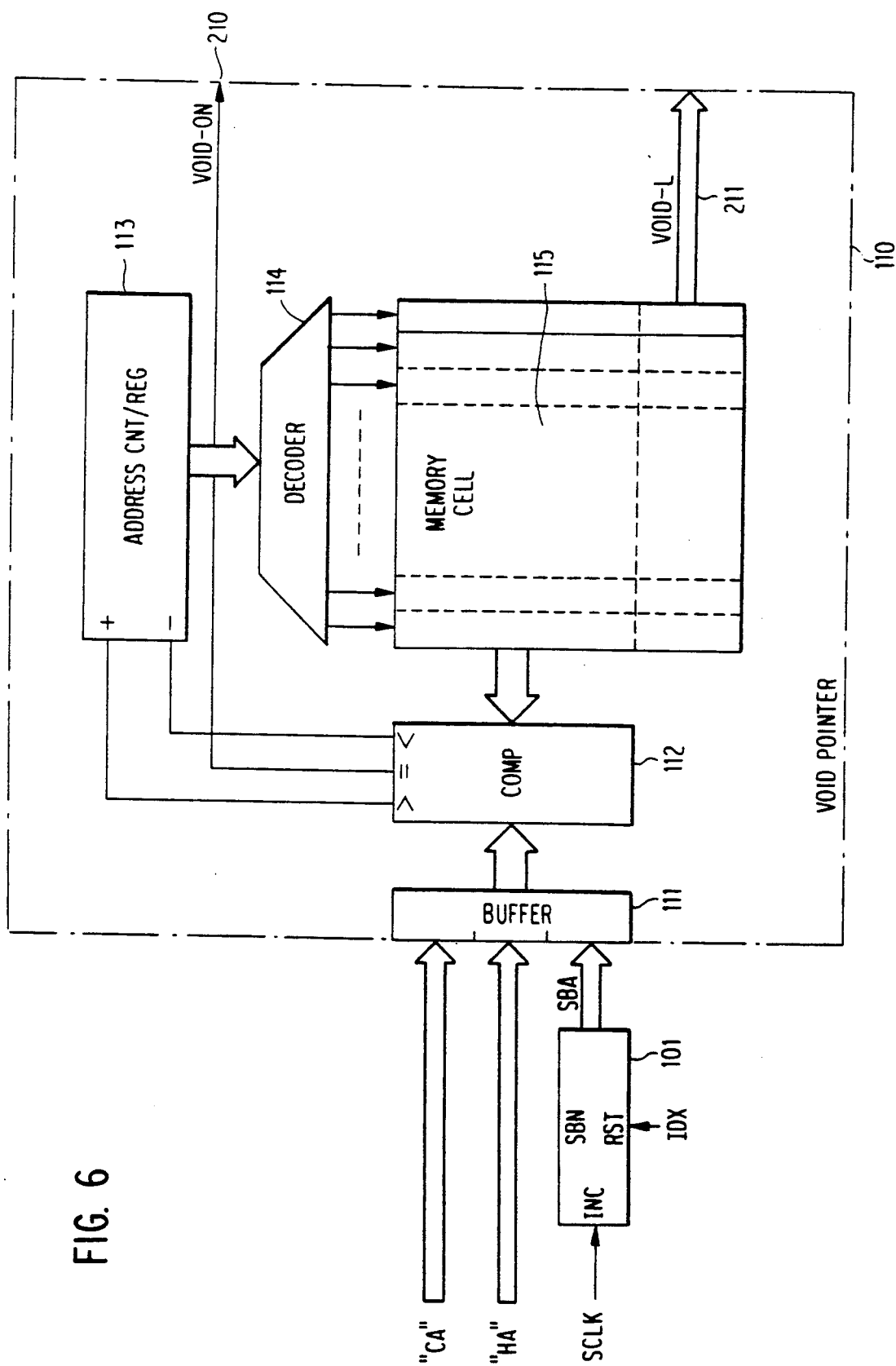
FIG. 6 is a block diagram showing a void pointer used in the void area skipping control circuit shown in FIG. 4.

Next, an example of the void pointer circuit (VOID POINTER) 110 in FIG. 4 will be explained with reference to FIG. 6. In FIG. 6, a buffer circuit 111 receives the cylinder address information "CA", head address information "HA", and servo-byte address information SBA, and holds the present address value of the selected head. A address coincidence detector (COMP) 112 receives the output of the buffer circuit 111 (the present address), and also receives, from a void area registering memory cell 115, the cylinder address, head address, and servo-byte address segment which show a void area previously stored in the void area registering memory cell 115. An address counter register 113 either increments or decrements the address stored in itself in the direction increasing the possibility of address coincidence. When the address coincidence detector 112 indicates that two addresses are different. A decoder 114 decodes the output address from the address counter register 113 to read all the corresponding segments in the void-area registering memory cell 115. When the coincidence is detected by the detector 112, the "VOID-ON" signal is generated on a signal line 210. At the time, a signal bus 211 outputs the length information VOID-L of the void area stored in the selected void-area registering memory cell 115.

Furthermore, if the position of the void-areas are common to all cylinder addresses and all head addresses (for example, the embedded servo information regularly disposed on the data tracks), a circuit for detecting only for servo-byte segment can easily be attached.

Now the detailed operation in the embodiment shown in FIG. 4 at the write mode will be explained with reference to FIG. 7.

When the void pointer circuit 110 asserts the void-area control initiation signal VOID-ON (FIG. 7(a)), the void-area-skipping control circuit 100 senses the on/off status of the original read gate signal R·GATE (FIG. 7(b)). If it is off, the circuit 100 recognizes the system to the write mode (WRITE) or non-operation mode (NOP), and initiates a series of void-area-skipping control sequences to write mode type. In this case, the difference between the write mode and non-operation mode is in that, in the non-operation mode (neither the write mode nor the read mode) the gate write control signal G·W·GATE (FIG. 7(m)) is always off. FIGS. 7(a)-7(p) shows the situation where the original write gate signal W·GATE (FIG. 7(c)) is on (i.e., the write mode).

When the void-control initiation signal VOID-ON comes on, the sequencer circuit 120 is triggered to generate the first sequence control tag signal SQ-1 (FIG. 7(d)) so that the interface valid signal I/F-VALID (FIG. 7(l)) becomes off. The length $L_e$ of the "EG" pattern is set to the sequence counter 130 and the "EG" pattern is outputted (FIG. 7(j)) from the pattern generator 150. The "EG" pattern is then set to the shift register 160. When the interface valid signal I/F-VALID becomes off, the content of gated write data signal GWDT (FIG. 7(p)) changes from the original write data signal WDT (FIG. 7(n)) to the serial input signal SFRSG from the shift register circuit 160, that is, "EG" pattern (FIG. 7(k)).

The first sequence control tag signal SQ-1 holds until the serial output signal SFRSG from the shift register circuit 160 completes the transmission of "EG" pattern ($E_s$ to $E_1$) This holding time interval ends at a timing when the sequence count termination signal SCN=0 (FIGS. 7(h) and 7(i)) is outputted from the sequence counter 130.

The second sequence control tag signal SQ-2 is generated (FIG. 7(e)) by the sequence circuit 120 triggered by the sequence count termination signal SCN=0. The tag signal SQ-2 makes the gated write control signal G·W·GATE "off" (FIG. 7(m)) by means of the AND gate 104 during the period determined by a void area skipping length ($L_v$) set in the sequence counter circuit 130 when the tag signal SQ-2 is generated. The tag signal SQ-2 is terminated by the sequence count termination signal SCN=0.

Then, the third sequence control tag signal SQ3 is generated (FIG. 7(f)) so that the write operation the PLO pull-in pattern ($G_s$-$G_1$, FIG. 7(k)) is carried out. The PLO pull-in pattern is required for the data separator circuit 52 to detect the resynchronization pattern "PSYNC" after skipping the void area in the read mode. As the "PSYNC" pattern, "0" pattern generated by a "0" constant circuit 179 is utilized.

The length of the PLO pull-in pattern ($G_s$-$G_1$) is determined by a PLO pull-in length ($L_g$) set in the and 7(i)). Then the writing of the PLO pull-in pattern during the sequence control tag signal SQ-3 terminates by the sequence termination signal SCN=0.

Next, the sequence control tag signal SQ-4 is generated to control the write operation of the resynchronization pattern "RSYNC" ($S_s$-$S_1$), which is outputted from the pattern generator 150 to the shift register 160 (FIG. 7(k)). The "RSYNC" pattern has a length $L_s$, and is supplied in serial to the circuit 105 and then outputted as the gated write data signal G·WDT.

When the write operation of the "RSYNC" pattern terminates at output timing of count termination signal SCN=0 from the sequence counter 130, the void sequences in the write mode are completed and the interface valid signal I/F-VALID again becomes on, so that the suspended normal data (user's data) write operation is resumed at the next bit $D_{i+1}$ and the normal write operation continues until the original write gate signal W·GATE becomes off (FIGS. 7(n) and 7(p)).

Next, the operation of the void-area-skipping control circuit 100 at the read mode will be explained with reference to FIG. 8.

During the time the original read gate signal R·GATE (FIG. 8(b)) is on, a sequence constituting a void-area-skipping operation in the read mode is executed when the void-control initiation signal VOID-ON is outputted (FIG. 8(a)). Since the fundamental flow of the control sequence is similar to that of the aforementioned write mode, only the different points will be explained.

An "EG" search is executed by the sequence control tag signal SQ-1 (FIG. 8(c)); the "EG" search means the detection of "EG" pattern ($E_5$ to $E_1$) indicating the suspension of the normal data pattern ($D_0$ to $D_i$) from the original read data signal RDT (FIG. 8(j)), and the inhibition of the transfer of "EG" pattern as the gated read data signal G·RDT (FIG. 8(p)). Upon the detection of the "EG" pattern, the interface valid signal I/F-VALID (FIG. 8(n)) is immediately set to off, and then the transfer of the original read data signal RDT as the gated read data signal G·RDT is inhibited until a sequence of the read void processing ends i.e., until the fourth sequence control tag signal SQ-4 (FIG. 8(f)) ends.

The sequence control tag signal SQ-2 (FIG. 8(d)) is for skipping the void area of predetermined length $L_v$ (FIG. 8(h)), as is similar to the write mode.

A search of the re-synchronization pattern (RSYNC) is executed by the sequence control tag signal SQ-3 (FIG. 8(e)) This sequence is for waiting the detection of the "RSYNC" pattern for re-starting data read after void area passes over.

A dummy skip is executed by the sequence control tag signal SQ-4 to shift the content of the shift register 160 by a bit length of "RSYNC" pattern so that the resume bit $D_{i+1}$ appears at bit-serial output terminal of the shift register 160, so that "RSYNC" pattern is completely excluded from the content of the shift register 160.

The lengths of the second and fourth sequence (sequences designated by the signals SQ-2 and SQ-4) are determined by the skip lengths ($L_v$ and $L_s$) (FIGS. 8(g) and 8(h)) set in the sequence counter 130, as is similar to the write mode. Also, the "EG" search sequence (sequence designated by SQ-1) and the "RSYNC" search sequence (sequence designated by SQ-3) last until the pattern coincidence detector 180 outputs the coincidence signal COMP=" (FIG. 8(m)). If the pattern coincidences in the "EG" and "RSYNC" search sequences are unsuccessful, the output of the sequence count termination signal SCN=0 (FIG. 8(h)) is determined by the "EG" timeout period of length $T_e$ and the "RSYNC" timeout period of length $T_s$, respectively, set in the sequence counter 130. FIG. 8(l) shows the output signal of the pattern generator 150, while FIGS. 8(m) and 8(g) denote the pattern coincidence detection signal "COMP=" and the read/write synchronization clock signal R/W REFCLK, respectively.

What is claimed is;

1. A magnetic disk apparatus comprising;
   a magnetic head for reading and writing user data from and to a plurality of data tracks of a magnetic disk which includes a data surface on which a plurality of concentric data tracks are provided said data surface having a void area in which recording of said user data is inhibited;
   positioning means for positioning said magnetic head at a target track selected from said plurality of concentric data tracks;
   detecting means for detecting a circumferential position of said magnetic head on said target track;
   means for storing a position and a length of said void area on said data surface;
   read/write control means for supplying a read signal read from said target track by said magnetic head as said user data, and for supplying said user data to said magnetic head as a write signal to write to said target track;
   timing clock generating means for generating a read/write synchronization signal; and
   control means for preventing the transmission of said read/write synchronization signal during a time period corresponding to said length of said void area when said circumferential position of said magnetic head is equal to said position of said void area.

2. A magnetic disk apparatus as claimed in claim 1, wherein said void area is a magnetically defective area.

3. A magnetic disk apparatus as claimed in claim 1, wherein said data surface is divided into a plurality of sectors, and said void area is an embedded servo area located on the leading edge of one of said sectors.

4. A magnetic disk apparatus as claimed in claim 1, wherein said timing clock generating means includes a servo surface of a magnetic disk coaxially provided with said magnetic disk having said data surface and a servo head located on said servo surface.

5. A method of writing user data to a data surface of a magnetic disk by means of a magnetic head, said data surface having a void area where writing of said user data is inhibited, said method comprising the steps of:
   positioning said magnetic head at a target track on said data surface;
   generating a write synchronization signal;
   supplying said user data to said magnetic head in synchronization with said write synchronization signal;
   detecting a position and a length of said void area in said target track;
   detecting a circumferential position of said magnetic head in said target track;
   writing a first predetermined pattern at a preceding position located before said void area in said target track when said circumferential position of said magnetic head is equal to said preceding position;
   preventing the generation of said write synchronization signal and said user data during a period corresponding to said length of said void are when said circumferential position of said magnetic head is equal to said position of said void area; and
   writing a second predetermined pattern at a succeeding position located after said void area in said target track when said circumferential position of said magnetic head is equal to said succeeding position.

6. A method of writing user data as claimed in claim 5, further comprising the step of writing an end gap pattern at said preceding position as said first predetermined pattern.

7. A method of writing user data as claimed in claim 5, further comprising the step of writing a re-synchronization pattern at said succeeding position as said second predetermined pattern.

8. A method of reading user data from a data surface of a magnetic disk by means of a magnetic head, said data surface having a void area where said user data is not recorded, said method comprising the steps of:
positioning said magnetic head at a target track on said data surface;
generating a read synchronization signal;
supplying said user data read from said target track by said magnetic head in synchronization with said read synchronization signal;
detecting first and second predetermined patterns recorded before and after said void area, respectively, in said target track by means of said magnetic head; and
preventing the generation of said read synchronization signal when said magnetic head detects said first predetermined pattern until said magnetic head detects said second predetermined pattern.

9. A method of reading user data as claimed in claim 8, wherein said first predetermined pattern is an end gap pattern recorded before said void area.

10. A method of reading user data as claimed in claim 8, wherein said second predetermined pattern is a re-synchronization pattern recorded after said void area.

11. An information storage disk apparatus comprising:
a head for reading and writing user data from and to a plurality of data tracks of a storage disk which includes a data surface on which a plurality of data tracks are provided, said data surface having a void area in which recording of said user data is inhibited;
positioning means for positioning said head at a target track selected from said plurality of data tracks;
detecting means for detecting a circumferential position of said head on said target track;
means for storing a position and a length of said void area on said data surface;
read/write control means for supplying a read signal read from said target track by said head as said user data, and for supplying said user data to said head as a write signal to write to said target track;
timing clock generating means for generating a read/write synchronization signal; and
control means for preventing the transmission of said read/write synchronization signal during a time period corresponding to said length of said void area when said circumferential position of said head is equal to said position of said void area.

12. An information storage disk apparatus as claimed in claim 11, wherein said void area is a defective area.

13. An information storage disk apparatus as claimed in claim 11, wherein said data surface is divided into a plurality of sectors, and said void area is an area located on the leading edge of each of said sectors.

14. A method of writing user data to a data surface of an information storage disk by means of a writing head, said data surface having a void area where writing of said user data is inhibited, said method comprising the steps of:
positioning said magnetic head at a target track on said data surface;
generating a write synchronization signal;
supplying said user data to said writing head in synchronization with said write synchronization signal;
detecting a void position and a length of said void area in said target track;
detecting a circumferential position of said writing head in said target track;
writing a first predetermined pattern at a preceding position located before said void area in said target track when said circumferential position of said writing head is equal to said preceding position;
preventing the generation of said write synchronization signal and said user data during a period corresponding to said length of said void area when said circumferential position of said writing head is equal to said void position of said void area; and
writing a second predetermined pattern at a succeeding position located after said void area when said circumferential position of said writing head is equal to said succeeding position.

15. A method of writing user data as claimed in claim 14, further comprising the step of writing a gap pattern at said preceding position as said first predetermined pattern.

16. A method of writing user data as claimed in claim 14, further comprising the step of writing a re-synchronization pattern at said succeeding position as said second predetermined pattern.

17. A method of writing user data to a data surface of an information storage disk by means of a reading head, said data surface having a void area where said user data is recorded, said method comprising the steps of:
positioning said reading head at a target track on said data surface;
generating a read synchronization signal;
supplying said user data read from said target track by said reading head in synchronization with said read synchronization signal;
detecting first and second predetermined patterns recorded before and after said void area, respectively, in said target track by means of said reading head; and
preventing the generation of said read synchronization signal when said recording head detects said first predetermined pattern, said preventing the generation of said read synchronization signal being carried out until said reading head detects said second predetermined pattern.

18. A method of reading user data as claimed in claim 17, wherein said first predetermined pattern is a gap pattern recorded before said void area.

19. A method of reading user data as claimed in claim 17, wherein said second predetermined pattern is a re-synchronization pattern recorded after said void area.

* * * * *

UNITED STATES PATENT AND TRADEMARK OFFICE
CERTIFICATE OF CORRECTION

PATENT NO. : 5,153,784

DATED : October 6, 1992

INVENTOR(S) : Yoshiji KITAMURA

It is certified that error appears in the above-identified patent and that said Letters Patent is hereby corrected as shown below:

Col. 3, line 59, after "in" insert --synchronization with a clock R/W REFCLK (Fig. 2(b))--;

Col. 6, line 23, delete ""onand" and insert --on and--;

Col. 8, line 53, after "in the" insert --sequence counter 130 at initiation of SQ-3 (Figs. 7(h))--;

Col. 9, line 18, delete "$E_s$to" and insert --$E_s$ to--;

Signed and Sealed this

Thirtieth Day of November, 1993

Attest:

BRUCE LEHMAN

Attesting Officer

Commissioner of Patents and Trademarks